Jan. 10, 1956   J. M. LOEB   2,730,710
LOBE SWITCHING RADAR SYSTEMS
Filed May 13, 1952   4 Sheets-Sheet 2

INVENTOR
Julien M. Loeb
BY
ATTORNEYS

United States Patent Office 2,730,710
Patented Jan. 10, 1956

2,730,710

LOBE SWITCHING RADAR SYSTEMS

Julien M. Loeb, Paris, France

Application May 13, 1952, Serial No. 287,551

Claims priority, application France May 16, 1951

8 Claims. (Cl. 343—10)

The present invention relates to radar systems having lobe switching or conical scanning in which the duration of the scanning cycle is of the same order of magnitude as the echo time of the transmitted wave for minimum range and more particularly to radar equipment in which the component of the echo signal having the scanning frequency exhibits a measurable dephasing with respect to the signal by which scanning or switching of the transmitted beams is effected.

As is known, in radars having lobe switching or conical scanning, the component of the echo signal at the scanning frequency measures the angular separation between the bearing of the target and the axis of symmetry of the conical scan, or between the bearing of the target and the plane of symmetry in the lobe switching pattern. This component falls to zero amplitude when the target bearing coincides with the scanning axis in the case of a conical scan, or when it is located in the symmetry plane of the lobes. In radar systems of known type however the scanning cycle is long in comparison to the echo time of the pulsed transmitted signal, and the phase of the component in the echo signal at the scanning frequency contains no intelligence as to the range of the target.

An object of the present invention is to provide a radar system in which the scanning is effected by electronic means at a very high frequency such that the component of the echo signal having the scanning frequency will have with respect to the scanning signal a phase proportional to the target distance, and in which means are provided for measuring the phase difference between the scanning signal and this component.

Another object of the present invention is to provide a radar system employing continuous wave transmission in which the scanning is effected at a very high frequency so that the component of the CW echo signal at the scanning frequency will have a phase proportional to the range, and in which means are provided to measure the phase difference between the scanning signal and this component.

Another object of the present invention is to provide a radar system of the pulsed transmission type in which the scanning is effected at a very high frequency such that the component of the pulsed echo signal having the scanning frequency will have with respect to the scanning signal a phase proportional to the range, in which means are provided for measuring the phase difference between the scanning signal and this component, and in which the length of the pulses can be much longer than in conventional radar systems, approaching the echo time for minimum range, the pulses being employed not for measurement of range but only for decoupling of the transmitting and receiving antennas.

Another object of the present invention is to provide a radar system in which the scanning is effected at very high frequency and including means for identification of the target.

Other objects and features of the invention will be explained in connection with the detailed description of a number of preferred embodiments now to be given in connection with the annexed drawings in which.

Figure 3:
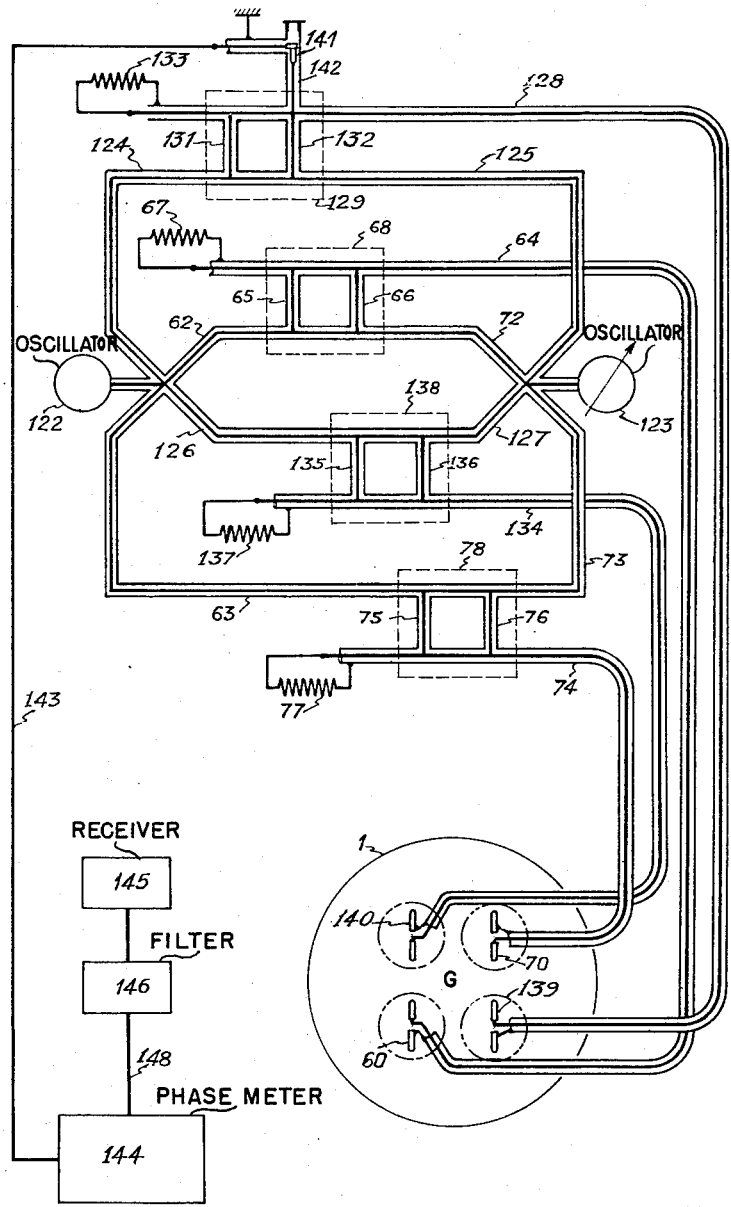
Figure 4:
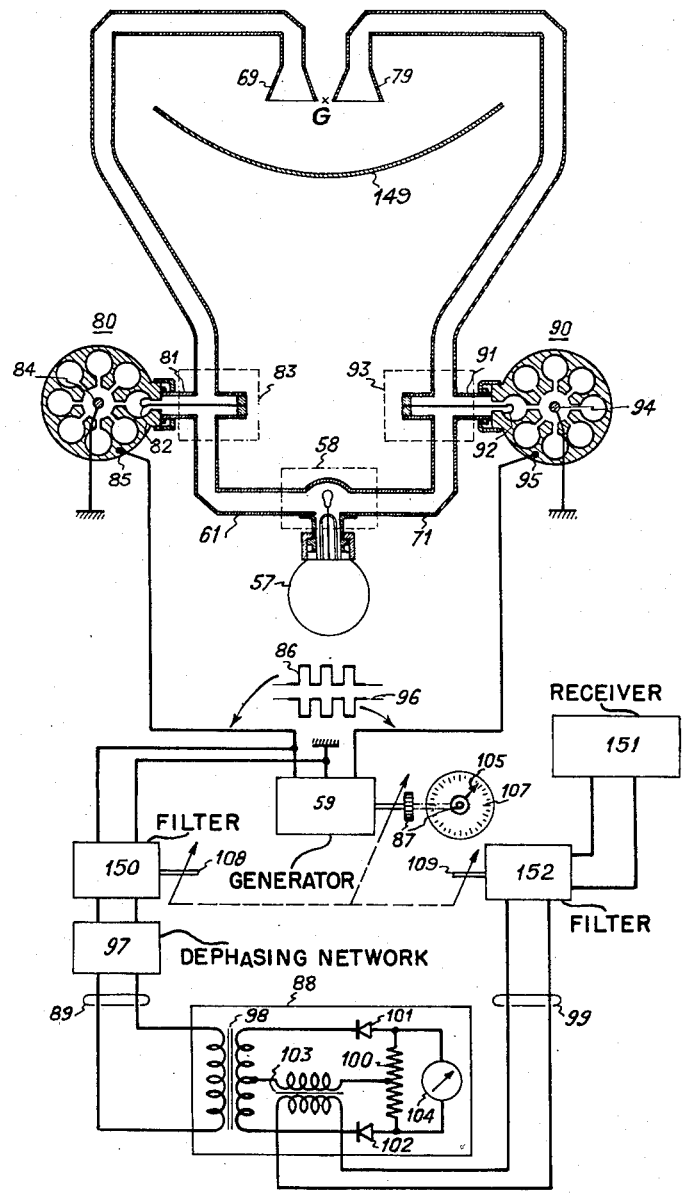

Fig. 3 is a diagram of a radar system according to the invention illustrating means for feeding and switching a plurality of transmitting antennas in order to achieve a conical scan in place of lobe switching; and Fig. 4 is a diagram, partly schematic and partly in block form, of another radar system according to the invention, showing a further feeding and switching system for the transmitting antennas, and illustrating alternative means for measurement of phase displacement in which the phase displacement is made equal to a predetermined value by variation of the lobe switching frequency.

The principle of the invention will be explained with reference to Fig. 1 for the case in which scanning is achieved by lobe switching.

Figure 1:
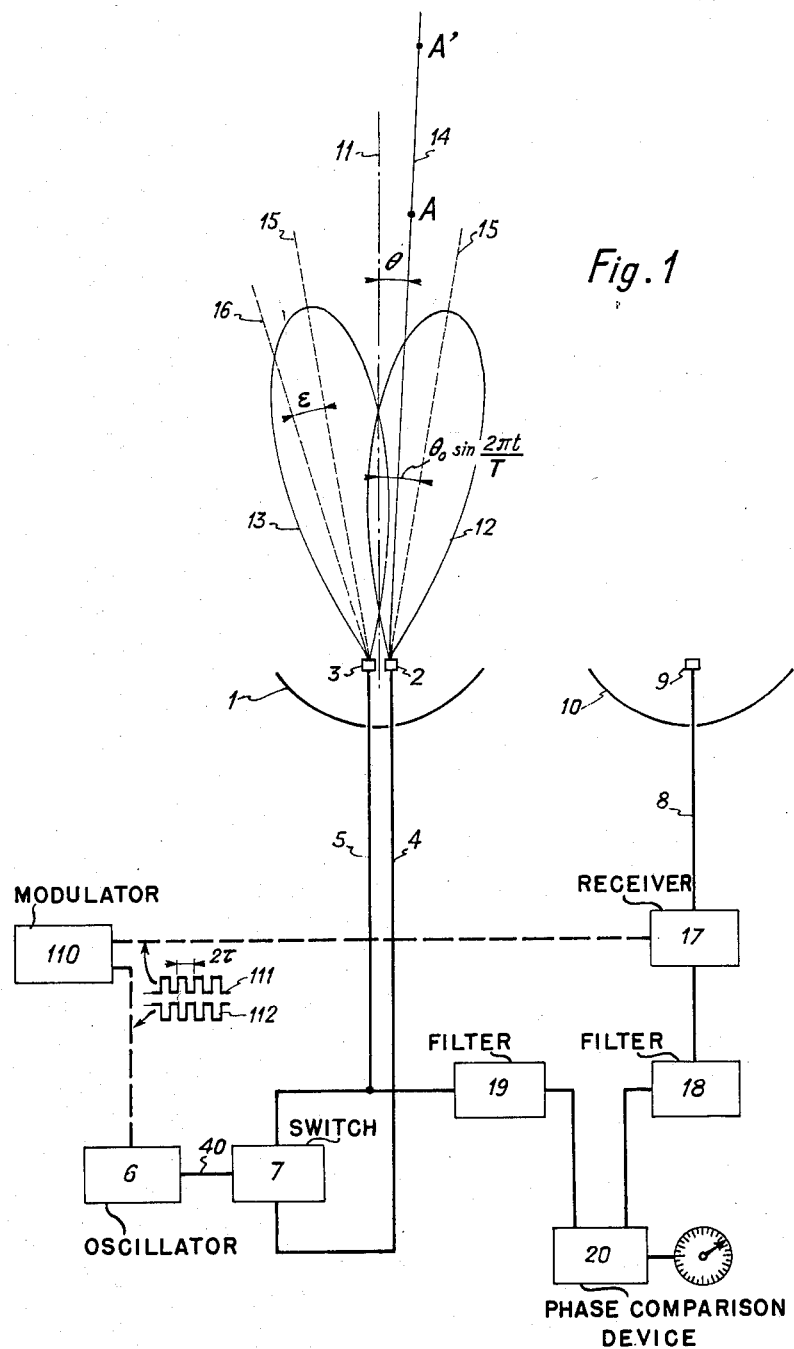
Fig. 1 represents in block diagram form a radar system according to the present invention.
Figure 2:
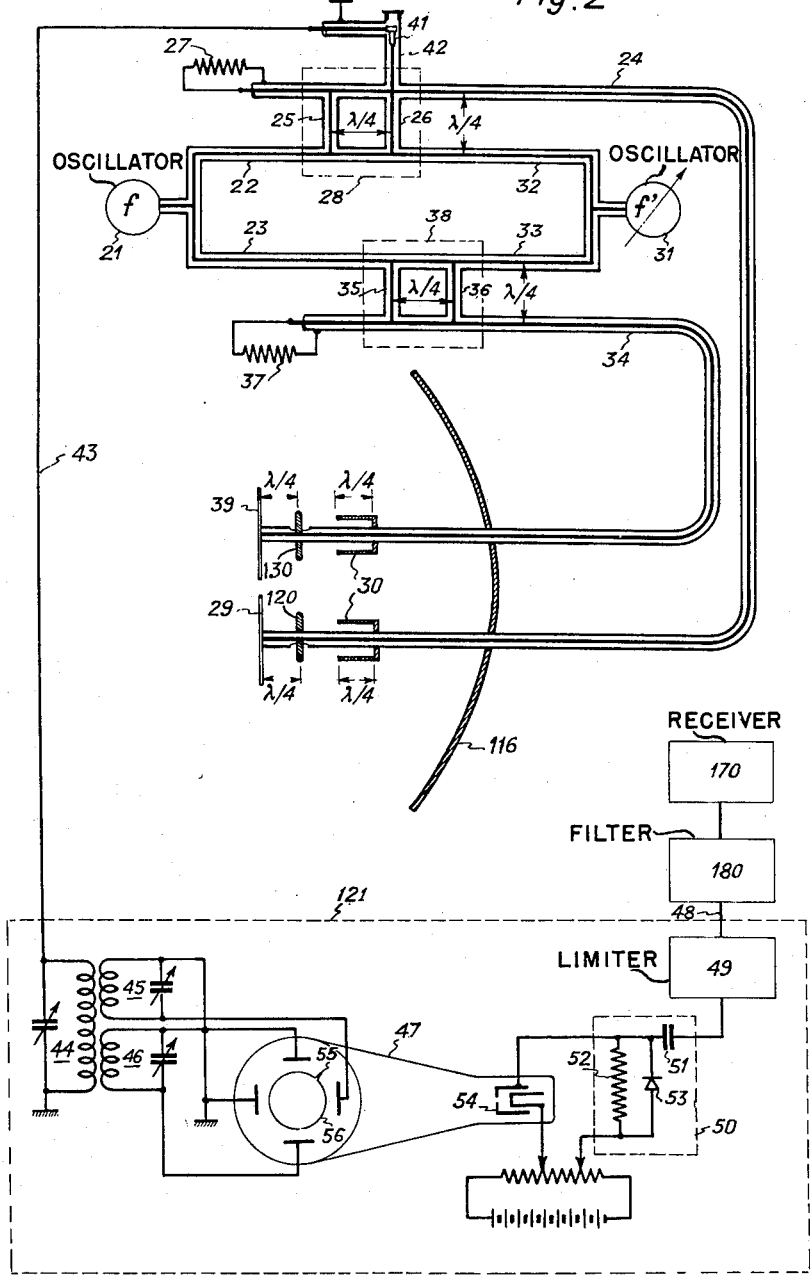
Fig. 2 is a diagram, partly schematic and partly in block form, of another radar system according to the invention showing the feeding and switching system for the two transmitting antennas and including details of the means for measuring the phase displacement between the scanning signal and the component of the echo signal at scanning frequency.

In Figs. 1, 2 and 3 are two microwave radiators disposed adjacent to each other in front of a parabolic reflector 1, on either side of the focus thereof.

Ultrahigh frequency energy is delivered to a main transmission line 40 from an oscillator 6 and is divided between the two transmission lines 4 and 5 leading to the radiators in order to effect lobe switching by means of a transmission line switching device 7 having a switching period T. The patterns 12 and 13 represent two successive positions for the emitted beam, assumed to be symmetric with respect to the symmetry axis 11 of the scan.

In Fig. 1, let A represent the target to be detected and let its bearing 14 make with the axis 11 an angle $\theta$. Let $\theta_0 \sin 2\pi t/T$ be the angle existing at the time $t$ between the axis of symmetry 15 of the emited lobe and the symmetry axis 11 and let $\phi(\epsilon)$ be the radiation pattern of the lobe, $\phi(\epsilon)$ measuring the relative intensity of the electric field in a direction 16 inclined at the angle $\epsilon$ to the axis of symmetry 15 of the lobe. Since $\epsilon$ is small, having at most a value of a few degrees and since $\phi(\epsilon)$ is an even function of $\epsilon$, one may write $$\theta(\epsilon) = 1 - \alpha \epsilon^2$$

in which $\alpha$ is a constant.

The signal received by the receiving antenna 9 at the focus of the parabolic reflector 10 is delivered over the transmission line 8 to the receiver 17. Subject to a constant of attenuation, the received signal is of the form $$\phi(\theta - \theta_0) \frac{\sin 2\pi t}{T}$$

and the fundamental component of this signal at the lobe switching frequency 1/T is $$2\alpha\theta\theta_0 \sin \frac{2\pi t}{T} \qquad (1)$$

The component (1) measures the angular separation $\theta$ between the bearing 14 of the target and the axis of symmetry 11 of the scanning pattern. It falls to zero in magnitude and changes in phase as the target passes from one to the other side of the axis 11.

In known radar systems in which the lobe switching occurs at low frequency, as for example by operation of mechanical means, the period T is large compared to the echo time, and the phase difference between the lobe switching signal and the component of the received signal at the frequency F, once detected, includes no measurable intelligence on range.

According to the invention there is chosen as switching or scanning period $T=1/F$ a period of the order of magnitude of the echo time $2D/c$ in which D represents the distance to the target A and c is the velocity of propagation of electromagnetic waves in free space. In order to determine the amplitude of the component of the received signal having the frequency F, it is necessary to replace $t$ in Equation 1 by $t-2D/c$, giving $$2\alpha\theta\theta_0 \sin\frac{2\pi}{T}\left(t-\frac{2D}{c}\right) \qquad (2)$$

The new signal (2) then exhibits with respect to the signal (1) a phase displacement $$\psi = \frac{4\pi D}{cT} = \frac{4\pi DF}{c}$$

the signal (1) thus representing the signal received upon reflection of the transmitted signal at a target infinitesimally distant from the transmitting antennas.

The signal (2) is obtained by passing through the filter 18 the signal received in the receiver 17. Measurement of the phase displacement between the signal (1) taken from the line 5 and the signal (2) taken from the filter 18 is made in the phase measuring device 20. If the scanning signal drawn from the line 5 is not sinusoidal, a filter 19 may be inserted between the lobe switching or scanning device 7 and the phase measuring device 20 in order to pass only the component of the scanning signal having the frequency F.

The actual amount of the phase displacement may be measured in the phase measuring device 20 as suggested above or it may be made equal to a prechosen value such as $k\pi$ by varying the switching frequency F of the switching device 7.

If for example it is desired to make $\psi$ equal to $\pi$ for a range $D=150$ kilometers, it is necessary to make $T=\frac{1}{500}$ second and $F=500$ cycles per second. It is to be noted that the term $\theta$ appears as a factor in the amplitude of the signal (2). It is therefore necessary for range measurement to train the transmitting reflector slightly off the target so that bearings 11 and 14 will not quite coincide. Otherwise the signal (2) would be of zero amplitude, and phase comparison would be impossible.

Range measurement is made by measuring the phase displacement of the two signals having the frequency F. Rigorously speaking the pass band of the filter 18 need be only wide enough to permit the passage of the frequency F as modified by the Doppler effect. For a frequency $F=500$ cycles per second and a radial velocity of the target of 300 meters per second the change in frequency due to the Doppler effect is $\frac{1}{2000}$ cycle per second. It is impossible to achieve a filter narrow enough to accommodate only the Doppler changes from the scanning frequency, and even if it were possible to build one its time constant would be prohibitive. It is satisfactory to choose for the filter 18 a band width of one cycle per second.

The transmitter 6 may be pulse modulated or it may be unmodulated. If the emitted wave is pulse modulated, the pulses are not employed for measurement of range, but the pulse modulation may be used in effecting decoupling between the transmitter and the receiver, as will be presently described.

For equal transmitted powers the signal to noise ratio of the radar system of the invention is 60 db better than that of a conventional radar system having a video amplifier of one megacycle pass band. If therefore in the radar system of the invention one employs an unmodulated transmitter of 100 watts power, the power loss will be 40 db by comparison with a pulse modulated transmitter having $10^6$ watts peak power. The signal to noise ratio of the radar system of the invention is however still 20 db better than that of the conventional radar of $10^6$ watts peak pulse power, which corresponds to a threefold increase in range or to a target having an equivalent dipole area reduced by a factor of 100.

Referring now to Fig. 2, 21 designates a source of ultrahigh frequency energy of the frequency $f$ feeding two coaxial lines 22 and 23. 31 represents a source of ultrahigh frequency energy of variable frequency $f'$ close to the frequency $f$. The source 31 is connected to feed the coaxial lines 32 and 33. The difference $f-f'=F$ is equal to the desired frequency of lobe scanning. F may be made equal to a predetermined desired value by adjusting the frequency controlling element in the oscillator 31.

The coaxial lines 22 and 32 are connected to a coaxial line 24 by means of a duplexer 28 of the type known as a right angle ring comprising two coaxial stubs 25 and 26 and a balancing impedance 27 equal to the characteristic impedance of the line 24. The line 24 feeds the dipole 120. The characteristic admittance of the stubs 25 and 26 is equal to the square root of 2 times the common characteristic admittance of the lines 22, 24 and 32. Each of the stubs 25 and 26 is a quarter of a wave length long for the frequency $f$, and they are spaced a quarter of a wave length apart.

The coaxial lines 23 and 33 are connected to a coaxial line 34 by means of a duplexer 38 comprising two coaxial stubs 35 and 36 and a balancing impedance 37 equal to the characteristic impedance of the line 34. The line 34 feeds the dipole 130. The characteristic impedance of the stubs 35 and 36 is equal to the square root of 2 times the common characteristic admittance of the lines 23, 33 and 34. Each of the stubs 35 and 36 has a length equal to a quarter of a wave length for the frequency $f$, and they are spaced a quarter of a wave length apart. Moreover the stub 35 is connected to the line 23 at a point a quarter of a wave length farther from the source 21 than the point of junction of the stub 25 with the line 22, i. e. the connections of 35 and 23 on the one hand and of 26 and 32 on the other hand are equally spaced from the source 21.

The line 22 transmits to the duplexer 28 the wave $Ue^{2\pi jft}$ whereas the line 32 transmits to it the wave $Ue^{2\pi jft}e^{2\pi jFt}$ assuming that the sources 21 and 31 generate voltages of the same amplitude U. The line 24 receives from the duplexer 28 the voltage $Ue^{2\pi jft}[1+e^{2\pi jFt}]$. This voltage is amplitude modulated at the frequency F.

The line 23 transmits to the duplexer 38 the wave $Ue^{2\pi j(ft-\frac{1}{4})}$ and the line 33 transmits to it the wave $Ue^{2\pi j(ft+\frac{1}{4})}e^{2\pi jFt}$. The line 34 receives from the duplexer 38 the voltage $Ue^{2\pi j(ft-\frac{1}{4})}[1+e^{2\pi j(Ft+\frac{1}{2})}]$. This voltage is amplitude modulated at the frequency F and is in phase opposition with the voltage received by the line 24 from the duplexer 28.

Lines 24 and 34, of equal lengths between duplexers 28 and 38 and dipoles 120 and 130 respectively (plus or minus integral wave lengths) pass through the parabolic reflector 116. The first of these feeds the dipole 120 and is terminated at the disk-shaped reflector 29 located a quarter of a wave length from the dipole 120. The second line 34 feds the dipole 130 and is terminated by means of a disk-shaped reflector 39 a quarter of a wave length from the dipole 130. As is well known, movable balance converters 30 may be employed to decouple the half wave dipoles from the external surface of the lines 24 and 34. The system just described makes possible lobe scanning at very high speed, for example at several kilocycles or tens of kilocycles per second.

A crystal rectifier 41 is connected to the line 34 by means of the coaxial stub 42. The output signal from the crystal, including a voltage at the frequency F, is connected by line 43 to one input of the phase meter 121. The reference signal passed through the line 43 is applied to the circuit 44 which is tuned to the frequency F. The two secondary circuits 45 and 46 are so tuned that the current circulating in the circuit 45 is 45° in phase behind the voltage induced in the winding of this circuit and so that the current circulating in the circuit 46 is 45° in advance of the voltage induced in the winding of that circuit. Under these conditions a circular scan is obtained on the screen of the cathode-ray tube 47, giving the well known J type scan.

The echo signal in the receiver 170 is filtered in the narrow band filter 180 and is applied via the connection 48 to the limiting circuit 49 and then to the differentiating and rectifying circuit 50 comprising condenser 51, resistance 52 and rectifier 53. The short positive pulses produced by the circuit 50 are applied to the grid 54 of the cathode-ray tube 47. The receiver 170 and filter 180 may be similar resepectively to the receiver 17 and filter 18 of Fig. 1. The receiving antenna has been omitted from the drawing for convenience.

The phase difference between the sinusoidal signals applied to the phase meter 121 via lines 43 and 48 is measured by the angular position of the radial deflection 55 on the circular trace 56.

If it is desired to employ conical scanning instead of lobe switching or scanning, ultrahigh frequency sources 122 and 123 (Fig. 3) may be connected together by the four coaxial line pairs 124 and 125, 126 and 127, 62 and 72, and 63 and 73. The lines 124 and 125 are connected to a line 128 by the duplexer 129, comprising coaxial stubs 131 and 132 and the balancing impedance 133. The lines 62 and 72 are connected to the line 64 by the duplexer 68 comprising coaxial stubs 65 and 66 and the balancing impedance 67. The lines 126 and 127 are connected to the line 134 by the duplexer 138 comprising the stubs 135 and 136 and the balancing impedance 137. The lines 63 and 73 are connected to the line 74 by the duplexer 78 comprising coaxial stubs 75 and 76 and the balancing impedance 77. All of the duplexers have the same structure with respect to the length of their coaxial stubs, the separation and the characteristic impedance thereof as in the case described in connection with Fig. 2. Moreover, they are spaced successively along the direction joining the sources 122 and 123 by an eighth of a wave length for the frequency $f$. In this way voltages are obtained on the lines 128, 64, 134 and 74 at the frequency $f$, modulated at the frequency F and with successive phase differences of 90° from line to line.

Lines 128, 64, 134 and 74 are respectively connected to four dipoles 139, 60, 140 and 70 disposed in the focal plane of the parabolic reflector 1, at the corners of a square centered on the focus G of the reflector.

As in the case previously described in connection with Fig. 2, the scanning voltage of frequency F is detected by a crystal 141 in the stub 142, and it is applied via the line 143 to the first input of a phase meter 144. The echo signal received by the receiver 145 is filtered in the filter 146 and is applied via the line 148 to a second input of the phase meter 144. The phase meter 144 may be of the type described in connection with Fig. 2, and the receiver 145 and filter 146 may be similar to those described previously. The receiving antenna has been omitted from the drawing for simplicity.

Fig. 4 represents an alternative embodiment of the antenna feeding and switching system.

The two rectangular wave guides 61 and 71 are fed from the magnetron 57 by a coupling 58 effecting transformation from coaxial line to wave guide type transmission line and are terminated by two exponential horns 69 and 79 which open into the parabolic reflector 149 on either side of the focus G.

Two cavity magnetrons 80 and 90, which may be of the type described in the article of A. Gutton and J. Ortusi at page 310 of the August-September 1947, issue of L'Onde Electrique, are respectively coupled for modulation to the guides 61 and 71 by coaxial lines 81 and 91, which are terminated within cavities of the magnetrons 80 and 90 by coupling loops 82 and 92 and at their opposite extremities by coaxial line-wave guide couplers 83 and 93. The cathodes 84 ad 94 of the magnetrons are grounded, and the anodes 85 ad 95 are connected to a generator 59 of rectangular voltage waves having two outputs of opposite phase. The blocking signals for the magnetrons 80 and 90 are indicated at 86 and 96. Their period is 1/F and may be adjusted by turning the control knob 87.

The input to the filter 150 for selection of the fundamental component of signal 86 is connected to the output of the generator 59 which delivers the signal 86, and the component of frequency F emerging from the filter 150 is applied to the input of the phase comparator 88 via line 89 after undergoing a 90° phase change in the dephasing network 97.

The echo signal received in receiver 151 is passed through receiver filter 152 (similar to filter 18, Fig. 1) and is applied via line 99 to the second input of the phase comparator 88.

The phase concordance or comparator may be of known type. In the embodiment shown, it comprises a transformer 98 whose secondary terminals are connected to the resistance 100 through rectifiers 101 and 102. The midpoints of the secondary winding of transformer 98 and of the resistance 100 are connected via the secondary winding of a transformer 103. A galvanometer 104 is connected to the terminals of resistance 100. The galvanometer gives zero deflection when the voltages applied to the two inputs of the circuit 88 are in quadrature, i. e. when the voltages derived from the filters 150 and 152 are in phase or out of phase and therefore when $\psi$ is equal to $k\pi$, $k$ being an integer.

The mid-frequency of the pass bands of filters 150 and 152 can be adjusted by means of controls 108 and 109, which may be ganged with the control 87 operating on the scanning frequency F (the fundamental component of signals 86 and 96).

The operation of the apparatus for the measurement of the range to a single target and for excluding from consideration responses from other targets is therefore as follows:

The lobe switching frequencies for which the galvanometer gives zero deflection are $$F_1=\frac{c}{4D}, F_2=\frac{2c}{4D}, \cdots F_k=\frac{kc}{4D}$$

in which $k$ is an integer. The values $F_1, F_2 \ldots F_k$ are members of an arithmetic progression. For range determination, the control 87 is adjusted toward higher scanning frequencies F so as to pass successively through two consecutive frequencies $F_k$ and $F_{k+1}$ which give phase opposition between the scanning frequency and the component of the echo signal having the scanning frequency. Then $$D=\frac{c}{4(F_{k+1}-F_k)}$$

The control 87 is coupled with a pointer 105 moving over a scale 107 graduated in range.

If two targets A and A′ lie on the same bearing, the first would give rise to an echo whose component at the scanning frequency is $$a_1 e^{4\pi j \frac{D_1 F}{c}}$$

in which $D_1$ is the range to the target A and $a_1$ is a coefficient which depends only on the range and on the characteristics of the target A. The second will give rise to an echo whose component at the scanning frequency will be $$a_2 e^{4\pi j \frac{D_2 F}{c}}$$

in which $D_2$ is the range to the target A′ and $a_2$ is a coefficient depending only on the range and on the characteristics of the target A′.

The sum of the two components is $$a_1 e^{4\pi j \frac{D_1 F}{c}} + a_2 e^{4\pi j \frac{D_2 F}{c}}$$

and this latter signal will be either in phase or out of phase with the scanning voltage for values of F which annul;

$$a_1 \sin 4\pi \frac{D_2 F}{c} + a_2 \sin \frac{4\pi D_2 F}{c}$$

These values of F are evidently not in arithmetic progression. Consequently, an arithmetically progressional relation for the values $F_1$, $F_2$ ... $F_3$ is the criterion by which the target is identified.

It has been assumed until now that the receiving antenna received no direct radiation from the transmitting antenna. In radar systems of known type for long range there is customarily a 200 db difference between the power level of the transmitted signal and that of the echo. Under the conditions previously assumed for a CW transmitter of 100 watts of ultrahigh frequency power and a receiver filter of 1 cycle per second pass band, the radar of the invention provides a gain of 20 db by comparison with a pulsed radar of $10^6$ watts peak power and 1 mc. pass band receiver. It is therefore necessary to decouple the transmitting and receiving antennas by at least 220 db, assuming that the radar of the invention is to observe targets where echo is 20 db below normal. When such decoupling is not practical, for example in the case of movable radar equipment, it is desirable to choose for the transmitter a pulsed transmitter producing pulses of duration $\tau$ at a recurrence rate of $2\tau$, in which $\tau$ is equal to or less than the echo time $2D_m/c$ applicable to the minimum range $D_m$ of the equipment.

In Fig. 1, 110 is a modulator providing rectangular signals 111 and 112 in phase opposition which are respectively applied to the transmitter 6 and the receiver 17 so as to block one of these components while the other is unblocked, and vice versa. It is necessary that the filters 18 and 19 permit passage of the scanning frequency F only, to the exclusion of the fundamental component ½τ of the signals produced by the modulator 110. For this reason the minimum period T of the scanning cycle should be selected of a value substantially removed from $2\tau$. For example in the case of a radar system of minimum range $D_m = 15$ kilometers the value of $F = 1/T$ effecting 180° phase change in the component at the scanning frequency will be $$F_1 = 5000 \text{ c/s} \quad T_1 = \frac{1}{F_1} = 200 \text{ } \mu\text{sec}$$

In order to effectuate decoupling between the transmitting and receiving antennas it is necessary that $$\tau \leq \frac{2D_m}{c}$$

which for $D_m = 15$ kilometers, gives $\tau \leq 100$ μsec. If $\tau$ were chosen equal to 100 microseconds, the fundamental component of the decoupling signal 111—112 would be exactly 5000 cycles per second and it would pass through the filters. Instead therefore $\tau$ may be chosen for example as 20 microseconds.

It is important to note that in contrast with radar systems of known type it is not necessary in order for the system of the invention to operate with pulsed transmission that its receiver have a video pass band. The form of the pulsating signal need not be preserved in the receiver because it is sufficient to extract the component in the echo having the scanning frequency. It is therefore sufficient that the video amplifier have a band width at least equal to the fundamental ½τ of the pulse repetition rate.

While the invention has been described in terms of a number of preferred embodiments, the scope of my invention is set out in the appended claims.

I claim:

1. A radar system comprising a radio frequency oscillator, a plurality of radiators, a radio frequency switch connected to feed the output of the oscillator successively to said radiators in cyclical fashion at a cyclical rate of the same order of magnitude as the echo time for typical targets to be observed with the system, means to vary the cyclical rate of operation of the switch over a plurality of octaves, a radio receiver, tunable means linked to said rate varying means to extract from the signal received in said receiver the component varying at said cyclical rate, and means to compare the phase of said component with a signal of the same frequency as and of fixed phase with reference to the operation of said switch.

2. A radar system comprising a radio frequency oscillator, a plurality of radiators, a radio frequency switch connected to feed the output of the oscillator successively to said radiators in cyclical fashion, means to vary the frequency of operation of said switch over a plurality of octaves, a radio receiver, tunable means linked to said switching frquency varying means, said tunable means being coupled to the receiver to select from the received signal the component at said switching frequency, and phase comparison means receiving as inputs said component and a signal having the same frequency as and a fixed phase with respect to the operation of said switch, whereby upon variation of said switching frequency during reflection of the signal transmitted by said radiators to said receiver at a target, a plurality of switching frequencies may be noted which are related to each other as the members of an arithmetic progression and at all of which the phase difference observed in said phase comparison means is an integral number of half cycles of said switching frequency, the lowest member of said progression corresponding to a phase difference of one-half cycle between the signals applied to said phase comparison device.

3. A radar system comprising a radio frequency oscillator, a plurality of radiators, a radio frequency switch coupled to feed the output of the oscillator to said radiators successively in cyclical fashion, means to vary the frequency of operation of said switch over at least one octave, a radio receiver, a narrow band pass filter variable in band pass frequency over the range of frequencies of said switching frequency, said filter being coupled to the output of the receiver, a phase comparator including an indicator, said comparator and indicator being adapted to give zero indication from said indicator when the signals whose phases are to be compared are of equal or opposite phases, means to couple the output of said filter to one of the inputs of said comparator, means to apply to the other input of said comparator a signal of the same frequency as and of fixed phase with reference to said switching frequency, and means to couple said switching frequency varying means and said filter together whereby said filter and switching means are tuned to the same frequency.

4. A radar system comprising two radio frequency oscillators tuned to frequencies differing by a desired lobe-scanning frequency, two radiators disposed adjacent the focus of a reflector, a first duplexer having inputs coupled by transmission lines to each of said oscillators and having an output coupled by a transmission line to one of said radiators, a second duplexer having inputs coupled by transmission lines to each of said oscillators and having an output coupled by a transmission line to the other of said radiators, the lines coupling said oscillators to said first duplexer being respectively a quarter of a wave length longer and a quarter of a wave length shorter at the frequency of oscillation of one of said oscillators than the lines coupling said oscillators to the other of said duplexers.

5. A radar system comprising a radio frequency oscillator, two wave guides both fed from said oscillator, said guides opening into a reflector adjacent the focus thereof, two modulating magnetrons coupled one to each of said guides, a modulator applying rectangular voltage waves 180° apart in phase between the cathodes and anodes of said magnetrons, a radio receiver, a first narrow band pass filter of variable band pass frequency coupled to the output of said receiver, a second narrow band pass filter of variable band pass frequency coupled to one of the outputs of said modulator, means to vary the frequency of said modulator over at least one octave, a control linking said modulator frequency varying means to the frequency controlling elements of said filters to maintain said filters tuned to the same frequency, a phase comparator having separate A. C. inputs and adapted to give zero indication when said inputs are 90° apart in phase, and a 90° phase shifter between one of said filters and said phase comparator.

6. A radar system comprising two radio frequency oscillators tuned to frequencies differing by a desired lobe-scanning rate, means to vary the frequency of one of said oscillators over a range at least equal to said lobe-scanning rate, $2n$ radiators, $n$ being an integer, said radiators being disposed in an array at uniform angular intervals about a center, $2n$ duplexers, each of said duplexers being coupled to one of said radiators by an output line and to both of said oscillators by separate input lines, the lines coupling one of said oscillators to the duplexers associated with radiators positioned diametrically opposite in said array differing in length by an odd number of quarter wave lengths for one of said frequencies, the lines coupling said one of said oscillators to duplexers associated with radiators adjacent each other in said array differing in length by an odd multiple of $\lambda/4n$ wherein $\lambda$ is said wave length, a radio receiver, tunable means linked to said frequency varying means to extract from the signal received in said receiver the component varying at said lobe-scanning rate and means to compare the phase of said component with a signal of the same frequency as and of fixed phase with respect to the scanning of the lobe produced by said radiators.

7. A radar sytsem comprising two radio frequency oscillators tuned to frequencies differing by a desired lobe-scanning rate, $2n$ radiators, $n$ being an integer, said radiators being disposed in an array at uniform angular intervals about a center, $2n$ duplexers, each of said duplexers being coupled to one of said radiators by an output line and to both of said oscillators by separate input lines, the lines coupling one of said oscillators to the duplexers associated with radiators positioned diametrically opposite in said array differing in length by an odd number of quarter wave lengths for one of said frequencies, the lines coupling said one of said oscillators to duplexers associated with radiators adjacent each other in said array differing in length by an odd multiple of $\lambda/4n$ wherein $\lambda$ is said wave length.

8. A radar system comprising two radio frequency oscillators tuned to frequencies differing by a desired lobe-scanning rate, four radiators disposed in a rectangular array, four duplexers, each of said duplexers being coupled to one of said radiators by an output line and to both of said oscillators by separate input lines, the lines coupling one of said oscillators to the duplexers associated with radiators diagonally opposite in said array differing in length by an odd number of quarter wave lengths for one of said frequencies, the lines coupling said one of said oscillators to duplexers associated with radiators adjacent each other in said array differing in length by an odd multiple of $\lambda/8$ wherein $\lambda$ is said wave length.

References Cited in the file of this patent

UNITED STATES PATENTS

| | | |
|---|---|---|
| 2,418,156 | Bollman | Apr. 1, 1947 |
| 2,437,286 | Witt | Mar. 9, 1948 |
| 2,490,899 | Cohen | Dec. 13, 1949 |
| 2,529,510 | Manley | Nov. 14, 1950 |
| 2,627,020 | Parnell | Jan. 27, 1953 |